Aug. 5, 1924.
F. J. CARTY
1,503,475
LOCOMOTIVE BOOSTER SYSTEM
Filed June 6, 1923 2 Sheets-Sheet 1
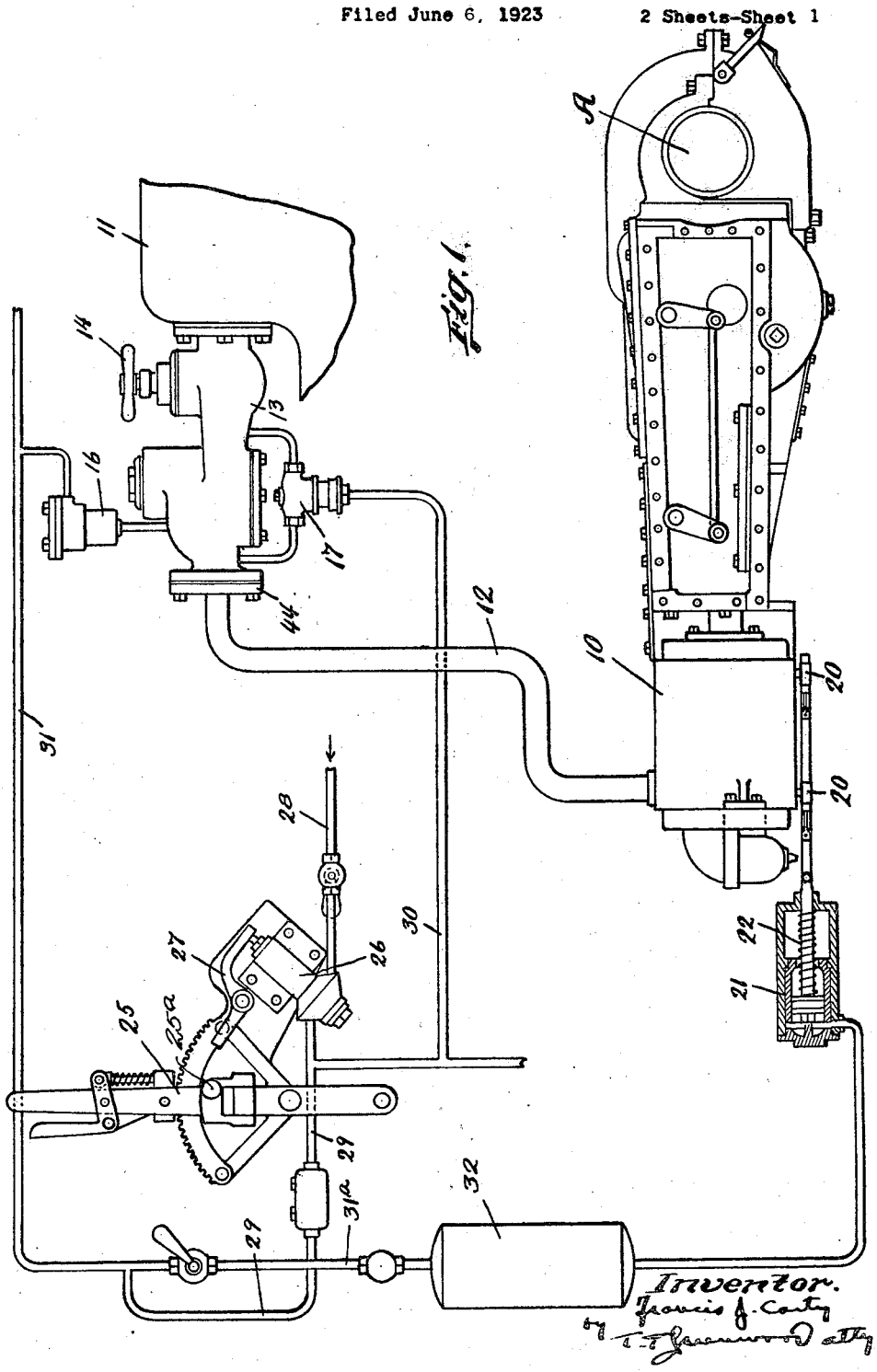

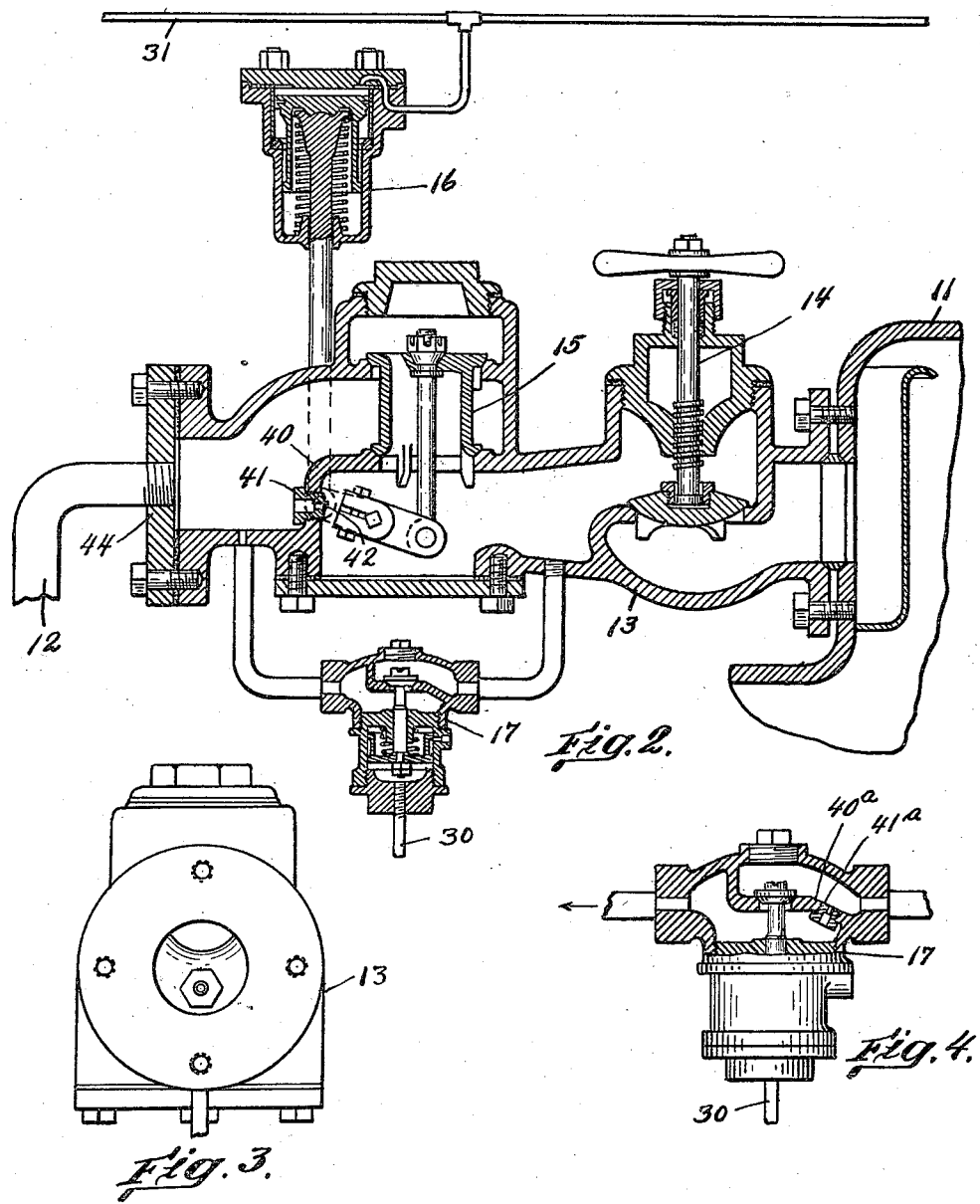

Patented Aug. 5, 1924.

1,503,475

UNITED STATES PATENT OFFICE.

FRANCIS J. CARTY, OF ROXBURY, MASSACHUSETTS, ASSIGNOR TO FRANKLIN RAILWAY SUPPLY COMPANY, A CORPORATION OF DELAWARE.

LOCOMOTIVE BOOSTER SYSTEM.

Application filed June 6, 1923. Serial No. 643,668.

*To all whom it may concern:*

Be it known that I, FRANCIS J. CARTY, a citizen of the United States, residing at Roxbury, in the county of Suffolk and State of Massachusetts, have invented an Improvement in Locomotive Booster Systems, of which the following is a specification.

This invention relates to locomotives and particularly to locomotive "boosters."

A booster is essentially an auxiliary steam engine which is or may be carried by the locomotive or the tender and is adapted to be connected with an axle thereof. The booster engine is adapted to be used to supplement the power of the main locomotive cylinders whereby to provide additional tractive effort at critical times as, for instance, on heavy grades or starting under heavy load. Normally the booster engine is arranged to be inoperative and is brought into use only as operating conditions require additional tractive effort. Under usual conditions of service the booster engine is used but a relatively small part of the running time of the locomotive. Under winter conditions, when the booster engine is called into play, the engine and the steam supply pipe connected therewith may be cold or practically at the temperature of the atmosphere, by reason of a previous extended period of non-use. When steam is turned into the cold engine and supply pipe, the steam may condense and the steam pressure may drop to such an extent as to interfere with the proper operation of the engine. Furthermore, trouble is or may be experienced because of the freezing of the condensate, which act may consequently render the booster engine inoperative.

A booster engine to be of maximum service should be in immediate operative condition, even though the length of time between successive operations is or may be relatively great.

An object of this invention is to provide means to maintain heated the booster engine and the steam supply pipe extended thereto at all times while the locomotive is on the road whereby to avoid the above enumerated troubles.

In carrying out this object of the invention, I may provide means to pass steam continually through the supply pipe and the booster engine cylinders whereby to keep them warm, and the steam for heating may exhaust into the atmosphere through the cylinder cocks of the booster engine, which cocks are adapted to be opened when the booster engine is not in actual operation. The supply of steam is adapted to be sufficient to keep all parts warm and in condition for immediate operation and yet is not adapted to be sufficient to build up such a pressure within the booster engine cylinders as to cause the engine to rotate.

It is highly desirable to have the heating steam pass through the booster engine at all times while the locomotive is in readiness for operation, and to have the heating steam shut off when the locomotive is in the engine house.

A separate control valve for the heating steam is not desirable for one reason because it requires especial attention of the engineer who may neglect to open the valve or to close it and thereby cause a waste of steam and the possibility of injury to mechanics who may be called upon to inspect or adjust the booster engine. Consequently, a further object of this invention is to provide means to insure a flow of heating steam through the booster engine and its steam supply pipe automatically when the booster engine is in readiness for service, which heating steam is arranged to be automatically turned off when the booster engine is rendered inoperative by the closing of the hand actuated booster steam supply valve.

A further object is generally to improve the construction and operation of locomotive booster engines.

Fig. 1 is a schematic representation of a locomotive booster system, including the booster engine and certain of its controlling devices, and with which system my invention is associated.

Fig. 2 is a sectional view through the throttle valve casing of the booster engine arranged in accordance with this invention.

Fig. 3 is an end view of the steam outlet end of the booster throttle valve casing and illustrating more particularly the by-pass heating plug.

Fig. 4 is a partial sectional detail of the preliminary booster throttle valve modified in accordance with my invention.

A booster engine 10 may be supplied with high pressure steam from the locomotive steam dome 11 or other suitable source of high pressure steam through the steam supply pipe 12 and control valves disposed in the valve casing 13, which valves are interposed between the steam pipe 12 and the steam dome 11. The control valves may comprise the hand actuated control valve 14 and the pneumatically operated main throttle valve 15, which latter valve is placed between the booster engine cylinders and the hand-actuated control valve 14. Said throttle valve 15 may be actuated by the pneumatic piston 16, which is arranged to be moved downward, when supplied with air under suitable pressure, and thereby raise the throttle valve 15 and admit steam to the booster engine cylinders. When the booster engine is brought into operation, it is adapted first to be operated idly at a slow speed in order to permit certain gears not shown to be brought in mesh whereby to connect the crank shaft of the engine with the locomotive or tender axle A and for this purpose a small amount of steam sufficient to cause the slow rotation of the engine is first admitted to the engine cylinders. When the driving connection between the axle and crank shaft is completed the full supply of steam is adapted to be admitted to the engine by the main throttle valve 15. The initial small supply of steam to the engine is or may be controlled by a preliminary throttle valve 17 which is arranged to take steam ahead of the main throttle valve 15, as is clearly indicated in Fig. 2. Said preliminary throttle valve is or may be operated pneumatically in a well understood manner. The cylinders of the booster engine are or may be provided with cylinder cocks 20 which are adapted to be maintained open while the booster engine is not in operation whereby to drain the cylinders of condensed steam. The cylinder cocks are adapted to be closed, however, when the booster engine is operating with its gears fully in mesh with the locomotive axle gear. The cylinder cocks may be of any suitable or desirable nature and are or may be governed by the pneumatic piston 21, Fig. 1, which piston is or may be arranged to be moved under pneumatic pressure in one direction to close the cylinder cocks and, when the pressure is relieved, a spring 22 or other suitable means may return said piston to its initial position and cause the cylinder cocks to re-open. The operation of the booster engine is or may be controlled from the engine cab. A pneumatic control valve 26 may be associated with the reversing lever 25 and so arranged that when said lever is in the forward end of its quadrant a pivoted bar 27 is actuated to open said valve 26.

Said valve bar 27 may be controlled by a booster latch 25ª, which latch is or may be carried by and pivoted to the reverse lever 25 in such a manner that, when in engagement with said bar, to hold the valve open, the latch will be held in upright position by the bar, but, when the reverse lever is moved back sufficiently on its quadrant, the latch will pass from under said bar and cause the valve 26 to close. The particular operation of the latch is of no particular importance so far as this invention is concerned and so is not described in greater detail.

When said valve 26 is opened air under suitable pressure is caused to flow from a supply pipe 28 through said valve 26 and into a pipe 29. Said pipe 29 may have one branch 30 which extends to the preliminary throttle valve 17, and another branch 31 which extends to the operating cylinder 16 for the main steam throttle valve 15. A third branch 31ª may extend from said pipe 29 to a timing chamber 32 and thence to the piston 21 which controls the cylinder cocks 20.

On locomotive boosters now in use there are other control devices which are not herein shown.

The operation of the system as thus described is such that when the pneumatic control valve 26 is opened by the engine man moving the booster latch 25ª under and thereby raising the valve bar 27, the preliminary steam throttle valve is caused to open, thereby to turn steam into the engine cylinders and cause the booster engine to rotate slowly. The main throttle valve 15 is then opened by its control cylinder 16 and the engine operates under full power and after a short period of time governed by the timing chamber 32, the cylinder cocks 20 are closed.

As previously stated, the booster engine may remain inoperative for relatively long periods of time and thereby become cold so that when steam is turned into the cylinders it condenses, thereby resulting in a reduction in steam temperature and pressure, which reduces the effectiveness of the booster engine. The steam supply pipe 12 is usually relatively long and it also may become cold during the period that the booster engine is inoperative and also condense steam; and the condensate may collect in the engine cylinders and freeze and thereby render the cylinder cocks and engine inoperative.

In accordance with this invention, I provide means to maintain the supply pipe 12 and the engine cylinders heated and in condition for immediate service and said means is also so arranged that automatically it must be operative when the booster engine is in readiness for operation. In carrying out this invention, I provide a by-pass around the throttle valve of the booster engine and between the booster engine and the hand operated control valve 14 whereby there is a supply of steam available for heating whenever said control valve 14 is open and the heating steam is cut off automatically and without any especial thought or attention from the engineer when said control valve 14 or its equivalent is closed by hand. Preferably I provide the by-pass around the main throttle valve 15 and for this purpose, the partition wall 40 in the valve casing 13 may be formed with a screw-threaded aperture therein and a plug 41 may be screw-threaded removably in said aperture. Said plug may be formed or provided with an orifice 42 therein through which steam may pass into the supply pipe 12 and thence to engine cylinders continually for so long as the hand operated valve 14 is maintained open and while the main and preliminary throttle valves are closed. Said orifice is adapted to be of a size sufficient to admit the passage of a suitable amount of steam for heating purposes but preferably sufficiently small to restrict the supply of steam below that at which the engine will be caused to rotate. The heating steam is adapted to pass eventually to the atmosphere through the normally open cylinder cocks 20. Preferably said plug 41 is inserted in the aperture in the partition wall 40 through the steam outlet end of the valve casing and said plug may be accessible through the outlet passage by the removal of the pipe flange 44 of the engine supply pipe 12 whereby to permit interchange of plugs to vary the amount of heating steam or to permit a solid plug to be inserted in said partition wall during the summer months or when heating steam is not desired.

Said plug may be otherwise arranged in said valve casing to carry out the invention but, preferably the arrangement is such that the heating plug is accessible by the removal of some convenient part of the casing.

While I prefer the above described arangement of means to by-pass the main throttle valve yet other means may be provided. For instance, a by-pass plug 41ª corresponding to said plug 41 may be inserted in the partition wall 40ª of the preliminary throttle valve 17 and function as above described.

Under some circumstances, the preliminary and main throttle valve and hand-operated control valve may be installed in a manner different from that shown and the by-pass may be arranged to by-pass steam for heating immediately around the preliminary throttle valve in the manner illustrated in Fig. 4, for instance, and from some other steam source than that illustrated.

For some purposes, the steam for heating may be bypassed around both the preliminary and main throttle valves of the booster engine. The steam for heating may be either saturated or superheated but, when the installation permits, I prefer to bypass superheated steam about the main and preliminary booster throttle valves as superheated steam reduces the quantity of steam required for heating purposes and improves the performance of the booster engine.

I claim:

1. The combination with a locomotive booster engine and a throttle valve therefor, of means continually operative when supplied with steam to admit heating steam to said engine, and hand-operated means to control simultaneously the supply of steam to said continually-operative means and to said throttle valve.

2. The combination with a locomotive booster engine and a throttle valve therefor, of means continually operative when supplied with steam to admit heating steam to said engine, and a hand-operated valve arranged to control simultaneously the supply of steam to said continually-operative means and to said throttle valve.

3. The combination with a locomotive booster engine and a throttle valve therefor, of means to admit heating steam to said engine continuously while supplied with steam, and means simultaneously to control the supply of steam to the aforesaid means and to said throttle valve.

4. In a locomotive booster system, comprising a booster engine, a hand-operated control valve, and an engine throttle valve disposed between the engine and said control valve, of means under control of said hand-operated control valve to admit heating steam to the engine continually while supplied with steam and independently of said throttle valve.

5. In a locomotive booster system, comprising a booster engine, a hand-operated control valve, and an engine throttle valve disposed between the engine and said control valve, of means to by-pass said throttle valve and admit steam continually to the booster engine while said control valve is open and under steam pressure.

6. A locomotive booster system comprising a booster engine and steam control mechanism comprising a valve casing in communication with said booster engine, said casing having a hand-operated control valve adapted normally to be open, and a throttle valve disposed in said casing between said hand-operated valve and said booster engine, and means to by-pass said throttle valve and admit a small amount of steam continually to said booster engine, said by-pass means arranged for control by said hand-operated valve.

7. A locomotive booster system comprising a booster engine and steam control mechanism comprising a valve casing in communication with said booster engine, said casing having a hand-operated control valve adapted normally to be open, and a throttle valve disposed in said casing between said hand-operated valve and said booster engine, said casing having a partition wall provided with a valve opening therethrough controlled by said throttle valve, and a second and continually open smaller aperture forming a by-pass about said throttle valve, the flow of steam through which smaller aperture is arranged to be controlled by said hand-operated throttle valve.

8. A locomotive booster system comprising a booster engine, a valve casing having a steam outlet opening in communication with said booster engine, a hand-operated throttle valve in said casing, a partition wall in said casing between said steam outlet opening and said hand-operated valve, said partition wall having a valve opening therethrough, and a throttle valve controlling said valve opening, said partition wall having an aperture therethrough arranged in proximity to said steam outlet opening and communicating therewith, and an apertured plug received in said aperture in a position to be accessible through said steam outlet opening.

9. A valve casing having steam inlet and outlet openings, a hand-operated valve disposed adjacent the steam inlet opening, a partition wall disposed adjacent said steam outlet opening, said partition wall having a valve opening therethrough arranged for communication with said steam outlet opening, a pneumatically-operated throttle valve governing said valve opening, said partition wall also having a screw-threaded aperture therethrough, and a screw-threaded plug received removably in said aperture and accessible through said steam outlet opening, said plug having an aperture therethrough arranged to by-pass said throttle valve and pass steam continually therethrough under control of said hand-operated valve.

10. A locomotive booster system comprising a booster engine, a valve casing having a steam outlet opening in communication with said booster engine, and a steam inlet opening, a hand-operated control valve in said casing adjacent the steam inlet opening, a partition wall in said casing between said steam outlet opening and hand-operated control valve, said partition wall having a valve opening therethrough, a throttle valve controlling said valve opening, said partition wall having an aperture therethrough, a plug having a passage therethrough received removably in said aperture, and a removable member secured to said valve casing over said plug adapted to be removed to permit access to said plug.

11. A locomotive having a valve which is arranged to be opened to place the locomotive in condition for operation, and closed to put the locomotive out of operation, a booster engine, a throttle valve therefor, and means under control of said first valve to supply heating steam continuously to the booster engine independently of said throttle valve, while said first valve is open and under steam pressure.

12. A locomotive booster system comprising a booster engine, a source of steam, a steam supply pipe connecting said engine with said source of steam, preliminary and main steam throttle valves controlling the supply of steam to said steam supply pipe, means including a hand-operated valve controlling the supply of steam to said preliminary and main throttle valves, and means under the control of said controlling means arranged to admit steam into said steam supply pipe and booster engine continuously for so long as steam is supplied to said preliminary and main throttle valves.

13. A booster system for a locomotive including a booster engine, a main throttle valve therefor, a preliminary throttle valve therefor, and means to maintain said booster engine in heated condition when said engine is idle, comprising means to bypass steam about both throttle valves and conduct the bypassed steam through said booster engine in quantities sufficient to maintain the booster engine heated but insufficient to cause the booster engine to operate, and means to control simultaneously both the supply of heating steam and the supply of steam to said throttle valves.

In testimony whereof, I have signed my name to this specification.

FRANCIS J. CARTY.